(12) United States Patent
Otsuki et al.

(10) Patent No.: US 12,602,658 B2
(45) Date of Patent: Apr. 14, 2026

(54) TRASH COLLECTION SYSTEM AND TRASH COLLECTION METHOD

(71) Applicant: TOYOTA JIDOSHA KABUSHIKI KAISHA, Toyota (JP)

(72) Inventors: Nobuhisa Otsuki, Toyota (JP); Haeyeon Lee, Tokyo-to (JP); Kunihiro Iwamoto, Nagakute (JP); Kota Oishi, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 83 days.

(21) Appl. No.: 17/831,754

(22) Filed: Jun. 3, 2022

(65) Prior Publication Data

US 2022/0398536 A1     Dec. 15, 2022

(30) Foreign Application Priority Data

Jun. 10, 2021     (JP) ................................. 2021-097504

(51) Int. Cl.
*G06Q 10/08* (2024.01)
*B65F 1/10* (2006.01)
*B65F 1/14* (2006.01)
*G06Q 10/0875* (2023.01)

(52) U.S. Cl.
CPC ........... *G06Q 10/0875* (2013.01); *B65F 1/10* (2013.01); *B65F 1/1468* (2013.01)

(58) Field of Classification Search
CPC ....... Y02W 30/10; G06Q 10/08; G06Q 50/28; G06Q 10/0875; G06Q 10/30; H04W 4/029
See application file for complete search history.

(56) References Cited

U.S. PATENT DOCUMENTS

| | | | | |
|---|---|---|---|---|
| 10,486,951 B2 * | 11/2019 | High | ..................... | B07C 5/3422 |
| 10,977,622 B2 * | 4/2021 | Borowski | .............. | G06Q 90/00 |
| 11,859,988 B2 * | 1/2024 | Rakah | .................. | G08G 1/0129 |
| 11,933,005 B1 * | 3/2024 | Nichols | .................. | E01H 1/006 |
| 12,125,069 B2 * | 10/2024 | Otsuki | .............. | G06Q 30/0635 |
| 2011/0010005 A1 * | 1/2011 | Tan | ........................ | B66C 13/46 |
| | | | | 702/56 |

(Continued)

FOREIGN PATENT DOCUMENTS

| | | |
|---|---|---|
| CN | 109693895 A | 4/2019 |
| JP | 2000-99893 A | 4/2000 |
| JP | 2012-096885 A | 5/2012 |

*Primary Examiner* — Florian M Zeender
*Assistant Examiner* — Milena Racic
(74) *Attorney, Agent, or Firm* — Sughrue Mion, PLLC

(57) ABSTRACT

A management server executes selection processing to select a mobile in charge of a replacement indicating at least one of a collection of a trash box installed in a facility and a replenishment of a trash box to a facility. The facility includes a first facility and a second facility. In the selection processing, when a request for the replacement in the first facility is received, a mobile for the first facility indicating a mobile in charge of this is selected. If a request for the replacement in the second facility is received during the replacement by the mobile for the first facility, it is determined whether a return condition for the mobile for the first facility is satisfied. If it is determined that the return condition is satisfied, an operation instruction of the replacement at the second facility is transmitted to the mobile for the first facility.

5 Claims, 12 Drawing Sheets

(56)     References Cited

U.S. PATENT DOCUMENTS

| | | | |
|---|---|---|---|
| 2015/0225188 A1* | 8/2015 | Belluk | B65G 67/02 |
| | | | 340/12.5 |
| 2015/0307273 A1* | 10/2015 | Lyman | B65F 1/1615 |
| | | | 705/26.61 |
| 2016/0379154 A1* | 12/2016 | Rodoni | G06Q 10/063114 |
| | | | 705/7.15 |
| 2017/0078400 A1* | 3/2017 | Binder | G07C 3/02 |
| 2017/0176986 A1* | 6/2017 | High | B60L 53/36 |
| 2017/0330134 A1* | 11/2017 | Botea | G06Q 10/06314 |
| 2019/0121368 A1 | 4/2019 | Bussetti et al. | |
| 2019/0377349 A1* | 12/2019 | van der Merwe | G05D 1/0231 |
| 2020/0109963 A1* | 4/2020 | Zass | G05D 1/0094 |
| 2020/0191580 A1* | 6/2020 | Christensen | G01C 21/343 |
| 2021/0024068 A1* | 1/2021 | Lacaze | G05D 1/0088 |
| 2021/0060786 A1* | 3/2021 | Ha | G06Q 20/14 |
| 2021/0188541 A1* | 6/2021 | Kurani | B65F 1/14 |
| 2021/0398406 A1* | 12/2021 | Ji | G08B 13/1481 |
| 2022/0204259 A1* | 6/2022 | Moore | B25J 9/1664 |
| 2022/0274895 A1* | 9/2022 | Mcconell | C05F 17/943 |
| 2022/0398655 A1* | 12/2022 | Gwon | G06Q 30/08 |

* cited by examiner

TRASH COLLECTION SYSTEM AND TRASH COLLECTION METHOD

The present application claims priority under 35 U.S.C. § 119 to Japanese Patent Application No. 2021-97504, filed Jun. 10, 2021, the contents of which application are incorporated herein by reference in their entirety.

TECHNICAL FIELD

The present disclosure relates to a system and a method to collect a trash discarded by a facility.

BACKGROUND

JP2012-96885A discloses a transport system in which a transportation of a baggage is performed by using a plurality of vehicles. This prior art system plans to allocate a vehicle to increase rate in the transportation of the baggage on a return route when type of a baggage carried on an outbound route is different from that carried on a return route.

Assume that a collection of a trash is performed using a dedicated trash box. The trash box is installed in a predetermined space in a facility such as a home and a store, for example. The trash box is collected periodically or in response to a collection request from the facility. A vacant trash box is replenished on the predetermined space at a collection of the trash box or after this collection. The transportation of the trash box is performed by a mobile such as a vehicle. This allows the collection of the trash.

If only a periodic replacement (e.g., a regular collection and replenishment) of the trash boxes installed in the predetermined spaces in a plurality of facilities is to be performed, it suffices to make a transportation plan that efficiently patrols each facility. However, if an on-demand replacement of the trash box occurs, it is necessary to respond to an unexpected replacement request. In particular, when the on-demand replacement is performed in parallel with the periodic replacement, a plurality of replacements may be concentrated in the same time zone. Therefore, it is desired to develop a new technique for realizing an efficient replacement on the assumption of the on-demand replacement.

One object of the present disclosure is to provide a new technique capable of realizing an efficient replacement when an on-demand replacement of a trash box is performed.

SUMMARY

A first aspect is a system to collect a trash discarded by a facility and has the following features.

The system includes a trash box, a plurality of mobiles, and a management server. The trash box is placed in a space facing a road for a mobile in a facility. Each of the plurality of mobiles configured to travel between the facility and a trash collection station. Each of the plurality of mobiles configured to perform a replacement indicating at least one of a collection of the trash box installed in the space and a replenishment of the trash box installed in the space. The management server configured to communicates with a computer of the facility and the plurality of mobiles, respectively.

When the management server receives a collection or a replenishment request of the trash box from the facility, it executes selection processing to select a mobile in charge of the replacement in the facility from the plurality of mobiles.

The facility includes a first facility and a second facility.

The trash box includes a first trash box collected from the first facility or replenished to the first facility, and a second trash box collected from the second facility or replenished to the second facility.

In the selection processing, the management server is configured to:

when a collection or replenishment request of the second trash box is received during the replacement of the first trash box by the mobile for first facility is performed, determine whether a return condition with respect to the mobile for the first facility is satisfied; and if it is determined that return condition is satisfied, transmit an operation instruction of the replacement in the second facility to the mobile for first facility, if it is determined that the return condition is not satisfied, select from the plurality of the mobiles excepting for the mobile for the first facility a mobile for the second facility indicating a mobile in charge of the replacement in the second facility, and transmit an operation instruction of the replacement in the second facility to the mobile for the second facility.

A second aspect further has the following features in the first aspect.

The return condition includes a condition that a distance between the first facility and the second facility is shorter than a distance between the first facility and the trash collection station.

A third aspect further has the following features in the first aspect.

The return condition includes a condition that a distance between a present location of the mobile for the first facility and the second facility is shorter than a distance between the first facility and the trash collection station.

A fourth aspect is a method to collect a trash discarded by a facility by collecting a trash box installed in a space facing a road for a mobile in the facility with a plurality of mobiles and has the following features.

Each of the plurality of mobiles travels between the facility and a trash collection station. Each of the plurality of mobiles performs a replacement indicating at least one of a collection of the trash box installed in the space and a replenishment of the trash box installed in the space.

A management server communicates with a computer of the facility and the plurality of mobiles respectively.

When the management server receives a collection or a replenishment request of the trash box from the facility, it executes selection processing to select a mobile in charge of the replacement in the facility from the plurality of mobiles.

The facility includes a first facility and a second facility.

The trash box includes a first trash box collected from the first facility or replenished to the first facility, and a second trash box collected from the second facility or replenished to the second facility.

In the selection processing, the management server is configured to:

when a collection or replenishment request of the first trash box is received, select from the plurality of mobiles a mobile for the first facility indicating a mobile in charge of the replacement in the first facility, and transmits to the mobile for the first facility an operation instruction of the replacement in the first facility;

when a collection or replenishment request of the second trash box is received during the replacement of the first trash box by the mobile for first facility is performed, determine whether a return condition with respect to the mobile for the first facility is satisfied; and if it is determined that the return condition is satisfied, an operation instruction of the replacement in the second facility is transmitted to the mobile for the first facility, if it is determined that the return condition is not satisfied, select from the plurality of the mobiles excepting for the mobile for the first facility a mobile for the second facility indicating a mobile in charge of the replacement in the second facility, and transmit an operation instruction of the replacement in the second facility to the mobile for the second facility.

According to the first or fourth aspect, when two or more collections or replenishment requests are received from the first and second facilities, the mobile in charge of the respective requests is selected. If the collection or replenishment request from the second facility is received during the replacement of the first trash box by the mobile for the first facility, it is determined whether the return condition with respect to the mobile for the first facility is satisfied. Then, if the return condition is satisfied, the operation instruction of the replacement in the second facility is transmitted to the mobile for first facility. Therefore, it is possible to realize efficient replacement when the on-demand replacement of the trash box is performed.

According to the second aspect, it can be determined that the return condition with respect to the mobile for the first facility is satisfied if the distance between the first facility and the second facility is shorter than that between the first facility and the trash collection station.

According to third aspect, it can be determined that the return condition with respect to the mobile for the first facility is satisfied if the distance between the current position of the mobile for first facility and the second facility is shorter than that between first facility and the trash collection station.

DESCRIPTION OF EMBODIMENT

Figure 1:
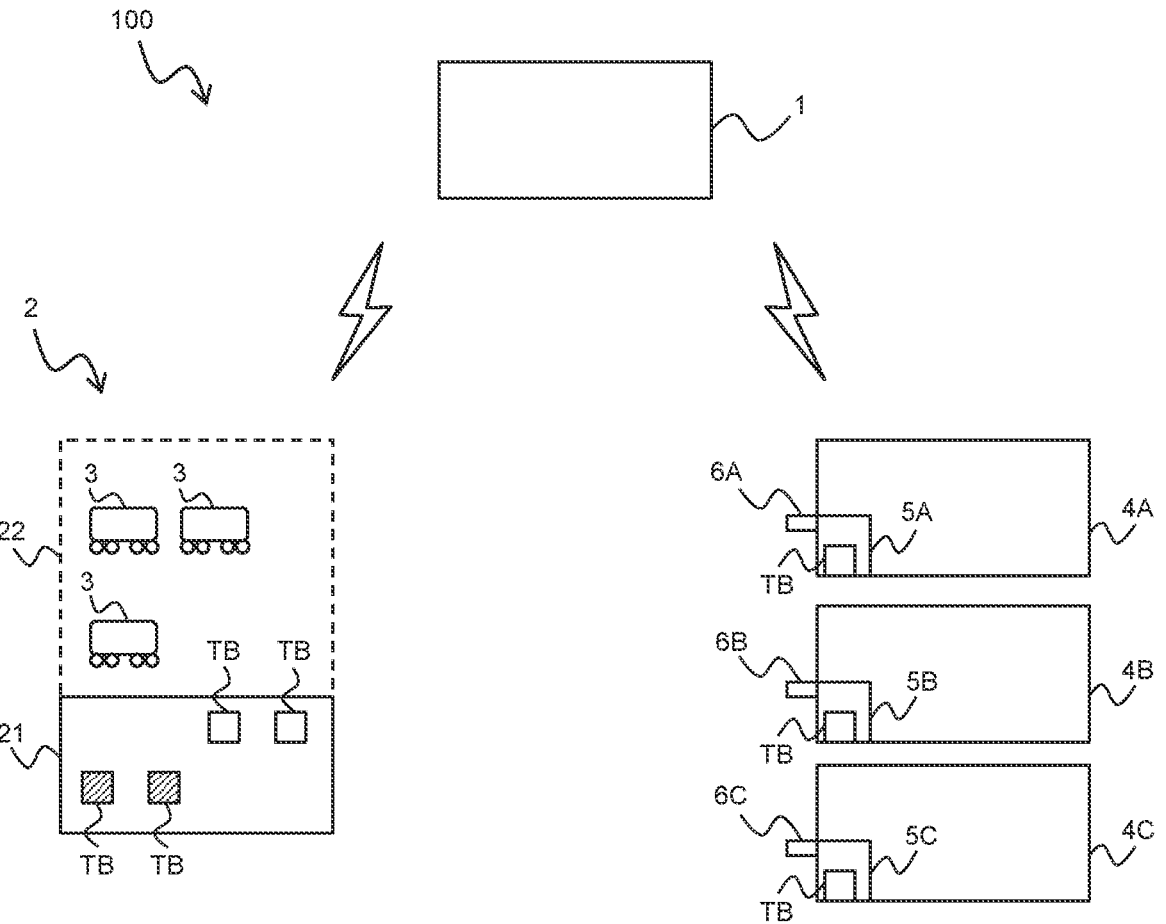
FIG. 1 is a diagram illustrating a premise of collection and replenishment service of a trash box.

Hereinafter, a collection system and a collection method of a trash according to an embodiment of the present disclosure will be described with reference to the drawings. Note that the collection method according to the embodiment is realized by computer processing executed in the collection system according to the embodiment. In the drawings, the same or corresponding portions are denoted by the same sign, and descriptions thereof are simplified or omitted.

1. Outline of Embodiment

1-1. Assumption

The collection system according to the embodiment is a system to perform a collection and replenishment service of a trash box TB. FIG. 1 is a diagram illustrating a premise of this collection and replenishment service. As shown in FIG. 1, a collection system 100 includes a management server 1, a trash collection station 2, a plurality of mobiles 3, and facilities 4A to 4C. Hereinafter, for convenience of explanation, the facilities 4A to 4C are collectively referred to as a "facility 4" except for a case where the facilities 4A to 4C are particularly limited.

The management server 1 controls the entire collection and replenishment service. The management server 1 communicate with the trash collection station 2, the plurality of mobiles 3 and the facility 4 via a network, respectively.

The trash collection station 2 includes a trash disposal area 21 and a standby area 22. In the trash disposal area 21, an unloading of the trash box TB from the mobile 3 is performed. In the trash disposal area 21, also, the trash is removed from the trash box TB and disposed of. In the trash disposal area 21, also, a loading of a vacant trash box TB to the mobile 3 is performed. In the standby area 22, the plurality of mobiles 3 waiting for the unloading or loading of the trash box TB or an operation instruction of the collection and replenishment service are waiting. The trash collection station 2 communicates with the plurality of mobiles 3 via the network separately.

Each of the plurality of mobiles 3 collects the trash box TB from the facility 4 in accordance with the operation instruction (a collection order). Each of the plurality of mobiles 3 replenishes the facility 4 with the vacant trash box TB according to the operation instruction (a replenishment order). An occupant (a driver) may or may not ride on each of the plurality of mobiles 3. Each of the plurality of mobiles 3 includes an automated driving device and an automated collection and replenishment device of the trash box TB. The automated driving device executes automated driving control for performing an autonomous travel of an outbound route from the current location of the mobile 3 (e.g., the standby area 22) to the facility 4 (e.g., the facility 4A) and automated driving control for performing an autonomous travel of a return route from this facility 4 to the trash collection station 2 (e.g., the standby area 22). The automated collection and replenishment device executes automated collection and replenishment control of the trash box TB on the facility 4.

Each of the facilities 4A to 4C is equipped with a space (spaces 5A to 5C) in which the trash box TB is installed. Hereinafter, for convenience of explanation, the spaces 5A to 5C are collectively referred to as an "installation space 5" except when the spaces 5A to 5C is particularly limited. The installation space 5 is provided facing a road for a mobile in the facility 4. At least one trash box TB is installed in each installation space 5. The trash box TB is provided by a business operator of the collection and replenishment service. The trash box TB is, for example, a container made of resin or stainless-steel. The trash box TB may include a lidding.

In the installation space 5, two or more trash box TB may be installed depending on types of trashes. Examples of the types of trashes include a combustible garbage, a non-burnable garbage, and a particular garbage (e.g., recyclable garbage, bins and cans). The trash box TB is configured to be identifiable as the types of trashes. For example, trash box TB is colored with an identification color corresponding to the types of trashes. In another example, an outer surface of the trash box TB is provided with an identification sign corresponding to the types of trashes. Examples of the identification sign include a bar code, a two-dimensional code such as a QR code (registered trademark), and a RFID (Radio Frequency Identification) tag.

In the installation space 5, the automated collection and replenishment control by the mobile 3 is executed. Each of the facilities 4A to 4C is equipped with a data acquiring device (data acquiring devices 6A to 6C). Each of the data acquiring devices 6A to 6C acquires data of a collection status of the trash in the trash box TB installed in each of the spaces 5A to 5C. Hereinafter, for convenience of explanation, the data acquiring devices 6A to 6C are collectively referred to as a "data acquiring device 6" except when the data acquiring devices 6A to 6C are particularly limited.

1-2. Collection and Replenishment Service

Figure 2:
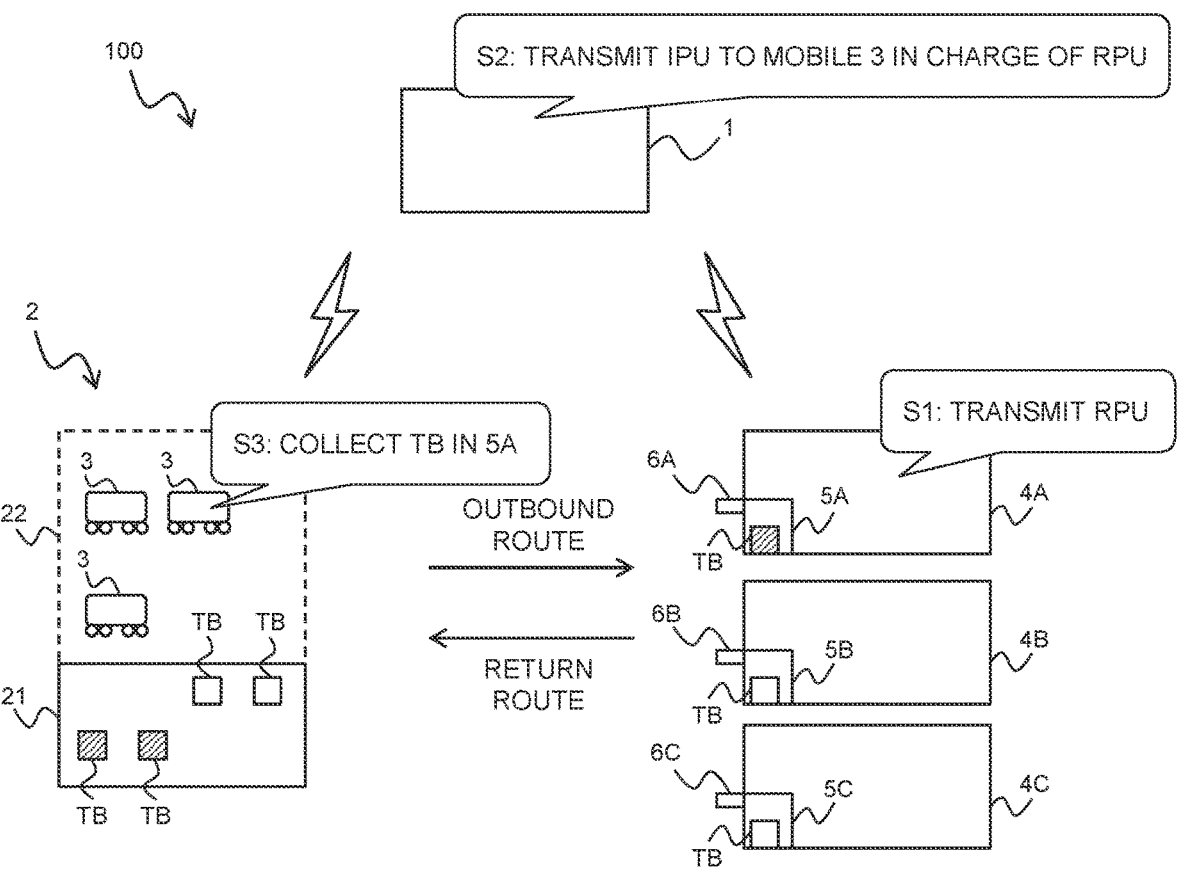
FIG. 2 is a diagram illustrating an outline of a collection service.

FIG. 2 is a diagram illustrating an outline of a collection service. In the example shown in FIG. 2, a flow of a collection service of the trash box TB installed in the space 5A is described. In this collection service, first, the facility 4A transmits a collection request RPU (Request for Pick-Up) to the management server 1 (step S1). The collection request RPU is transmitted when it is determined that a collection is required based on the data of the collection status acquired by the data acquiring device 6A.

The collection request RPU includes location data (e.g., latitude and longitude data) of the facility 4A (of the space 5A), number data of the trash box TB to be collected, and type data of the trash box TB to be collected (i.e., data of the types of trashes). The details of the step S1 will be described later.

In the example shown in FIG. 2, the management server 1 also selects a mobile 3 in charge of the collection request RPU and transmits a collection order IPU (an instruction for Pick-Up) to the selected mobile 3 (step S2). The collection order IPU includes the location data of the facility 4A (or the space 5A) in which the trash box TB to be collected is installed, the number data of the trash box TB to be collected, and the type data of the trash box TB. The collection order IPU may include the location data of the outbound route and return route. Details of the step S2 will also be described later.

Note that, in the step S1 of FIG. 2, the collection request RPU may not be transmitted from the facility 4A to the management server 1. In this case, the Facility 4A transmits the data of the collection status to the management server 1. And the management server 1 determines whether there is the collection request RPU from the facility 4A based on the data of the collection status. If it is determined that there is the collection request RPU from the facility 4A, the mobile 3 in charge of this request is selected and the collection order IPU is transmitted in the step S2 of FIG. 2.

In the example shown in FIG. 2, the collection of the trash box TB by the mobile 3 is also performed (step S3). The mobile 3 travels along the outbound route from the current location (e.g., the standby area 22) of the mobile 3 to the facility 4A (the space 5A) in accordance with the collection order IPU. When arriving at the facility 4A, the mobile 3 performs the collection of the trash box TB in the space in accordance with the collection order IPU. After the collection of the trash box TB, the mobile 3 travels along the return route from the facility 4A (the space 5A) to the trash collection station 2 in accordance with the collection order IPU. Details of the step S3 will also be described later.

In the example shown in FIG. 2, the replenishment of the vacant trash box TB may be performed by the mobile 3 simultaneously with the collection of the trash box TB. The management server 1 transmits a replenishment order IRS (Instruction for Re-Stocking) to the mobile 3. The replenishment of the vacant trash box TB may be performed by another mobile 3 different from the mobile 3 in charge of the collection of the trash box TB. In this case, the management server 1 transmits the replenishment order IRS to the said another mobile 3.

Figure 3:
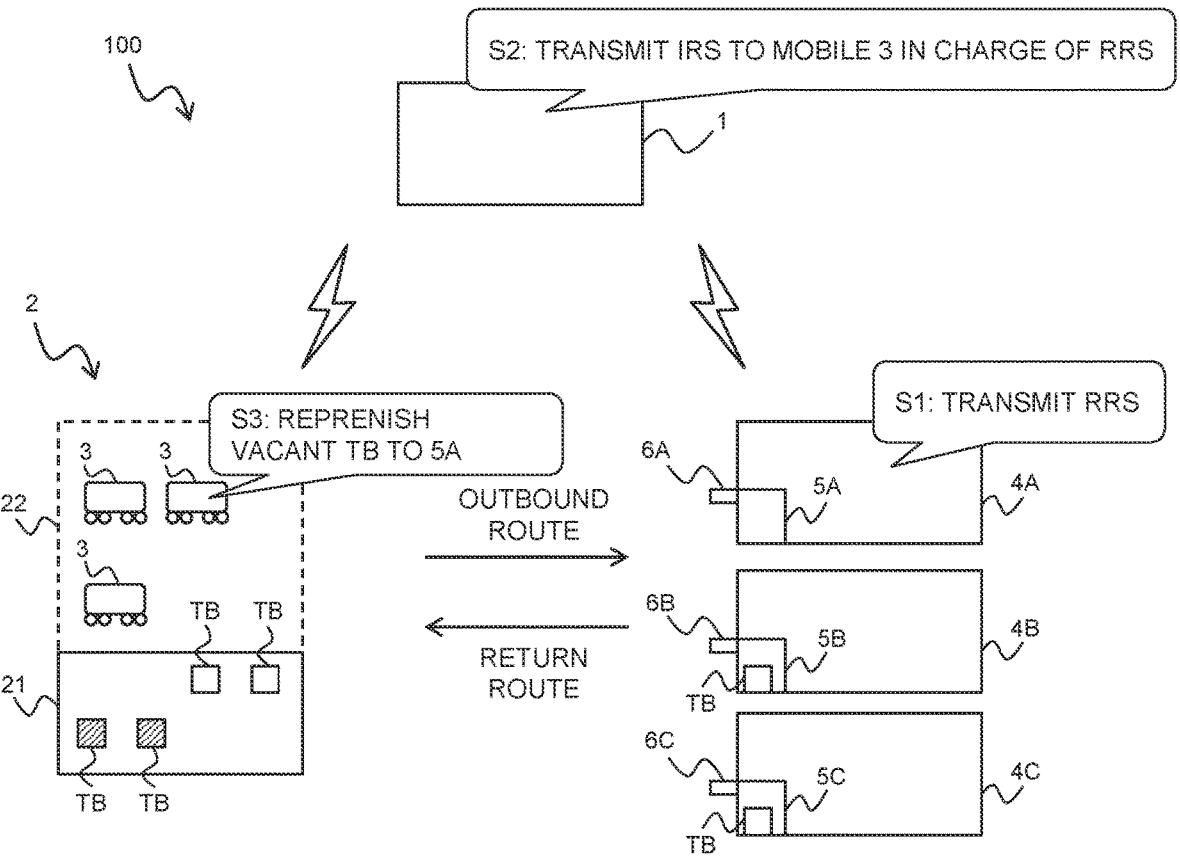
FIG. 3 is a diagram illustrating an outline of a replenishment service.

FIG. 3 is a diagram illustrating an outline of a replenishment service. In the example shown in FIG. 3, a flow of a replenishment service in which a vacant trash box TB is installed in the space 5A is described. In this replenishment service, first, the facility 4A transmits a replenishment request RRS (Request for Re-Stocking) to the management server 1 (step S1). The replenishment request RRS is transmitted when it is determined that the replenishment is required as a result of the determination based on the collection status data acquired by the data acquiring device 6A.

In the example shown in FIG. 3, the management server 1 also selects one mobile 3 in charge of the replenishment request RRS and transmits to the selected mobile 3 a replenishment order IRS (step S2). The replenishment order IRS includes the location data of the facility 4A (the space 5A) to which the vacant trash box TB is to be replenished, the data of the number of trash box TBs to be replenished, and the type data of the trash box TB to be replenished. The replenishment order IRS may include the location data of the outbound route and the return route.

In the step S1 of FIG. 3, the replenishment request RRS may not be transmitted from the facility 4A to the management server 1. In this case, the facility 4A transmits the collection status data to the management server 1. The management server 1 determines whether there is the replenishment request RRS from the facility 4A based on the collection status data received from the facility 4A. If it is determined that there is the replenishment request RRS from the facility 4A, the selection of the mobile 3 in charge of this is executed in the step S2 of FIG. 3 step S2, and the replenishment order IRS is transmitted to the selected mobile 3.

In the example shown in FIG. 3, the replenishment of the vacant trash box TB by the mobile 3 is also performed (step S3). The mobile 3 travels along the outbound route from a current location (e.g., the standby area 22) of the mobile 3 to the facility 4A (space 5A) in accordance with the replenishment order IRS. When arriving at the facility 4A, the mobile 3 performs the replenishment of the vacant trash box TB in the space 5A in accordance with the replenishment order IRS. After the replenishment of trash box TB, the mobile 3 travels along the return route from the facility 4A (the space 5A) to the trash collection station 2 in accordance with the replenishment order IRS.

Figure 4:
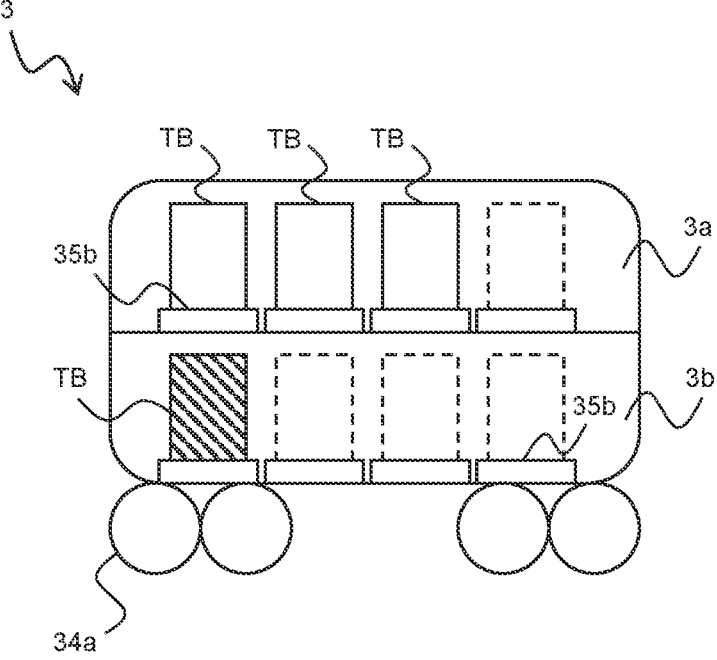
FIG. 4 is a schematic diagram showing an interior configuration example of a mobile.

FIG. 4 is a schematic diagram showing an interior configuration example of the mobile 3. In the example shown in FIG. 4, an interior space of the mobile 3 is divided into an upper space 3*a* and a lower space 3*b*. The upper space 3*a* accommodates for the vacant trash box TB (i.e., the trash box TB to be replenished with the facility 4). The lower space 3b accommodates for the trash box TB containing the trash (i.e., the trash box TB collected from the facility 4). According to the configuration example shown in FIG. 4, the replenishment of the vacant trash box TB can be performed simultaneously with the collection of the trash box TB containing the trash. Examples of operations of the automated collection and replenishment device included in the mobile 3 will be described later.

Figure 5:
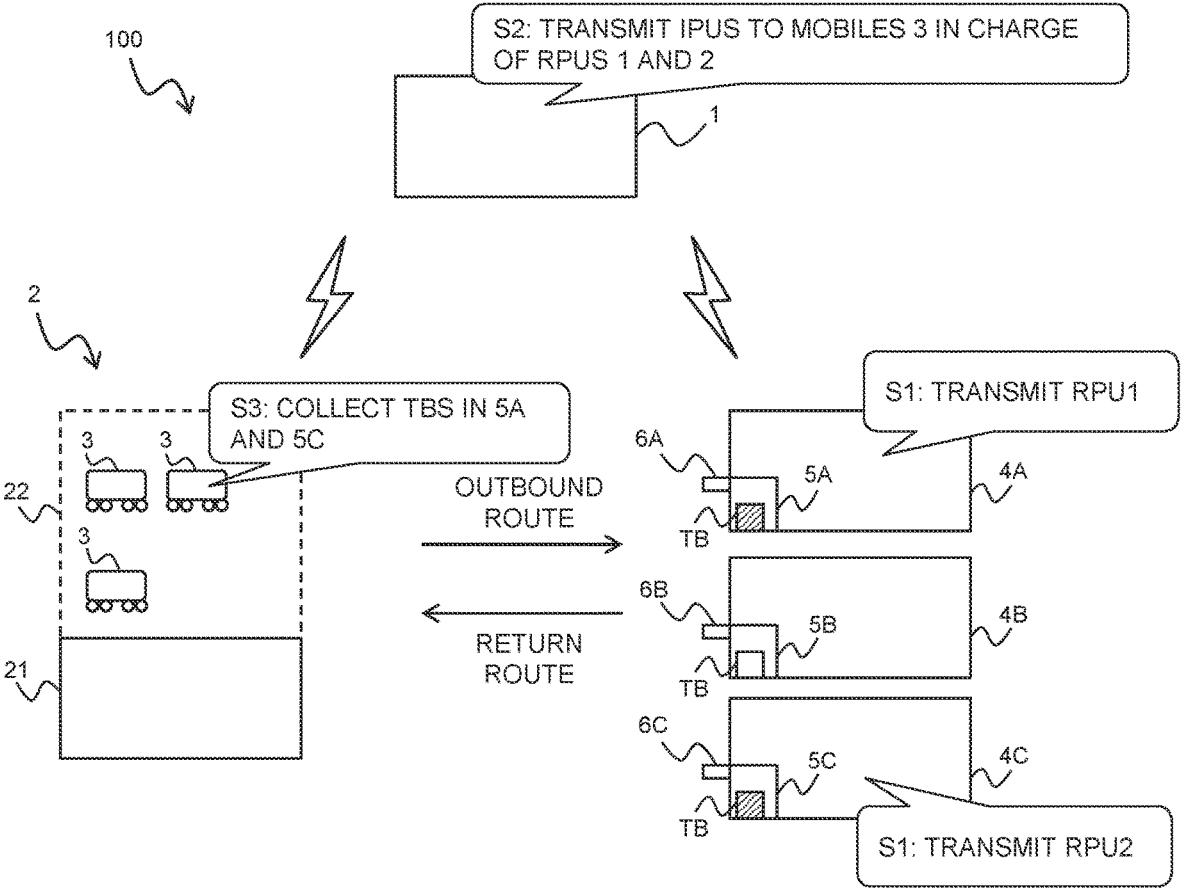
FIG. 5 is a diagram explaining another example of the collection service.

FIG. 5 is a diagram illustrating another embodiment of the collection service. In the example shown in FIG. 5, a flow of the collection service of two trash box TBs installed in the spaces 5A and 5C is described. In the example shown in FIG. 5, the facility 4A transmits to the management server 1 a collection request RPU1 and the facility 4C transmits a collection request RPU2 to the management server 1 (step S1). The collection requests RPU1 and RPU2 are transmitted at approximately the same time.

Note that collection requests RPU1 and RPU2 need not be transmitted from the facilities 4A and 4C to the management server 1. In this case, each of the facility 4A and 4C transmits its collection status data to the management server 1, respectively.

In the example shown in FIG. 5, the management server 1 selects two mobiles in charge of the requests RPU1 and RPU2, and the collection orders IPU are transmitted to the selected mobiles 3, respectively (step S2). The explanation of the collection order IPU is as described above. Hereinafter, for convenience of explanation, the mobile 3 in charge of the collection request RPU1 is also referred to as a "mobile for a first facility". The mobile 3 in charge of the collection request RPU2 is also referred to as a "mobile for a second facility".

In the example shown in FIG. 5, the collection of the trash box TB by the mobile for the first or second facility is performed (step S3). Each of the mobiles for the first and second facilities travels, for example, along respective routes from the respective current locations of the mobiles 3 to the respective facilities 4 (the facility 4A or 4C). When arriving at the respective facilities 4 (the facility 4A or 4C), each of the mobile for the respective facilities performs the collection of the trash box TB in the respective installation spaces 5 (the space 5A or 5C). After the collection of the trash box TB, each of the mobile for the respective facilities travels along the return route from the respective facilities 4 (the facility 4A or 4C) to the trash collection station 2.

In the example shown in FIG. 5, the mobile 3 in charge of the collection request RPU1 may be responsible for the collection request RPU2. That is, one mobile 3 may be selected as the mobile for the first second facilities. If a "return condition" for the mobile 3 responsible for the collection request RPU1 is satisfied, the said mobile 3 is selected as the mobile for the first and second facilities. The return condition will be described later.

If the mobile for the first facility is also selected as the mobile for the second facility, the selected mobile 3 travels along the route from the current location of the mobile 3 to the facility 4A. When arriving at the facility 4A, the mobile 3 performs the collection of the trash box TB in the space 5A. After the collection of trash box TB, the mobile 3 travels along a route from the facility 4A to the facility 4C. When arriving at the facility 4C, the mobile 3 performs the collection of the trash box TB in the space 5C. After the collection of the trash box TB, the mobile 3 travels a return route from the facility 4C to the trash collection station 2.

In the example shown in FIG. 5, the collection requests RPU1 and RPU2 may be transmitted at intervals. For example, after the transmission of the collection order IPU to the mobile 3 in charge of the collection request RPU1, the collection request RPU2 may be received in the management server 1 prior to the said mobile 3 returns to the trash collection station 2. In this case, the management server 1 selects another mobile 3 in charge of the collection request RPU2. However, if the "return condition" for the mobile 3 in charge of the collection request RPU1 is satisfied, the management server 1 selects the said mobile 3 as the mobile for the second facility.

The example of the collection service described in FIG. 5 also apply to the replenishment service. Replace the "collection request RPU" in the explanation of FIG. 5 with the "replenishment request RRS" and replace the "collection order IPU" with the "replenishment order IRS". In addition, the "collection of the trash box TB" is replaced with the "replenishment of the vacant trash box TB". This explains another example of the replenishment service.

Figure 6:
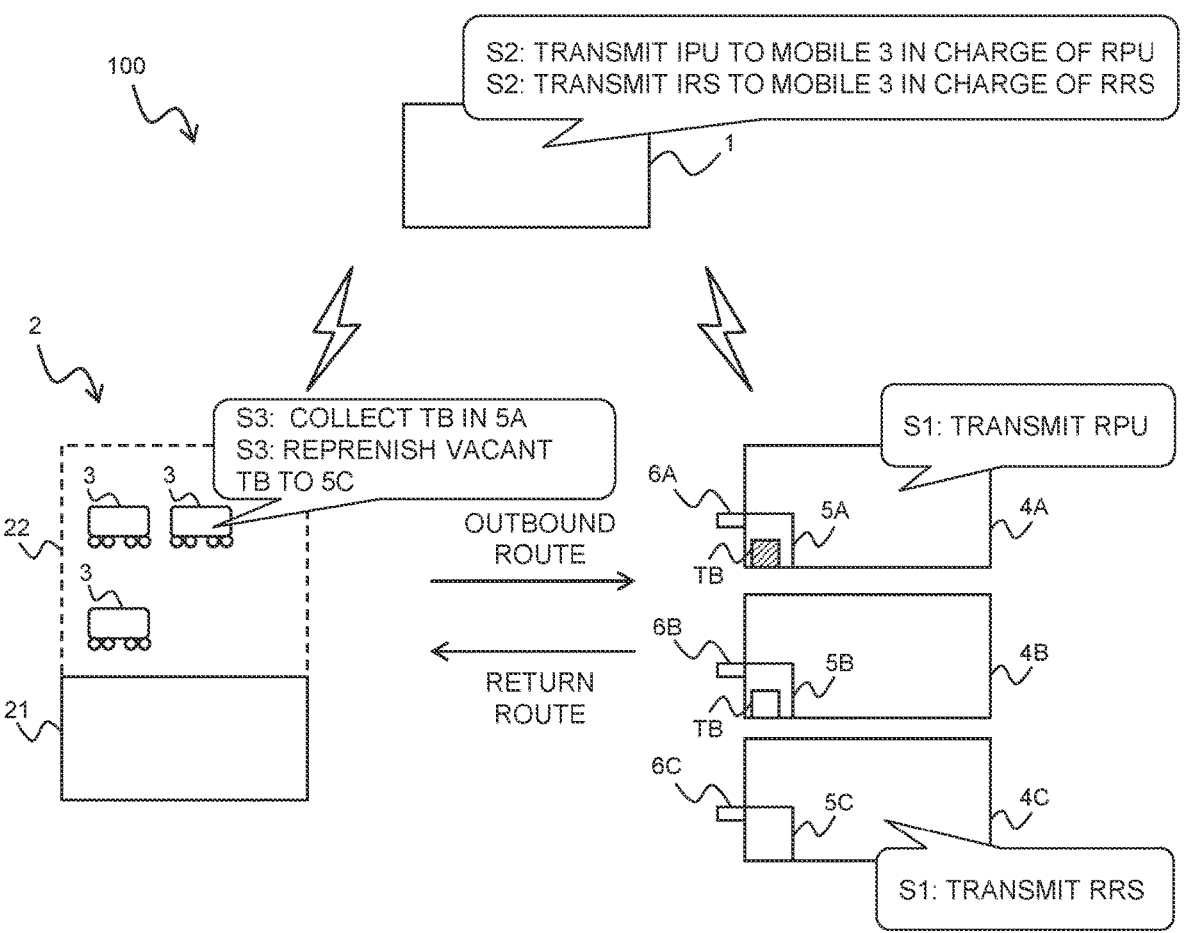
FIG. 6 is a diagram illustrating an example of the collection and replenishment service when a collection request and a replenishment request are transmitted from two facilities at the same time.

It is also conceivable that the collection request RPU and replenishment request RRS are transmitted from two facilities 4 at the same time. FIG. 6 is a diagram for explaining an example of the collection and replenishment service when the collection request RPU and the replenishment request RRS are transmitted from two facilities 4 at the same time. In the example shown in FIG. 6, a flow of the service is described, including the collection service of the trash box TB installed in the space 5A and the replenishment service of the vacant trash box TB to the space 5C. In the example shown in FIG. 6, the facility 4A transmits to the management server 1 the collection request RPU and the facility 4C transmits to the management server 1 the replenishment request RRS (step S1).

Note that the collection request RPU and the replenishment request RRS may not be transmitted from the facilities 4A and 4C to the management server 1. In this case, each of the facility 4A and 4C transmits its collection status data to the management server 1, respectively.

In the example shown in FIG. 6, the management server 1 also selects the mobile for the first facility and transmits the collection order IPU to the selected mobile for the first facility (step S2). In addition, the mobile for the second facility is selected in the management server 1 and the replenishment order IRS is transmitted from the management server 1 to the selected mobile for the second facility (step S2). The explanations of the collection order IPU and the replenishment order IRS are as described above.

In the example shown in FIG. 6, the collection of the trash box TB by the mobile for the first facility is also performed (step S3). In addition, the replenishment of the vacant trash box TB by the mobile for the second facility is performed (step S3).

In the example shown in FIG. 6, the collection request RPU and the replenishment request RRS may be transmitted at intervals. For example, after the transmission of the collection order IPU to the mobile for the first facility, the replenishment request RRS may be received in the management server 1 prior to the mobile for the first facility returns to the trash collection station 2. In this case, the management server 1 selects the mobile for the second facility. If the "return condition" for the mobile 3 in charge of the collection request RPU is satisfied, the said mobile 3 is selected as the mobile for the second facility.

As described above, according to the collection system 100, the collection of the trash box TB installed in the installation space 5 is performed based on the collection request RPU. In addition, the replenishment of the vacant trash box TB to the installation space 5 is performed based on the replenishment request RRS. In addition, when two or more request REQs for a replacement (the replacement means at least one of the collections and the replenishment) are transmitted from two or more facilities 4, mobiles in charge of the respective request REQs are selected. If the return condition is satisfied, one mobile 3 is selected to handle the two or more request REQs. Therefore, according to the collection system 100, it is possible to realize an efficient replacement even when an on-demand of the trash box TB is performed. This leads to an increase in convenience of the collection and replenishment service.

Hereinafter, the collection system according to the embodiment will be described in detail.

2. Collection System

2-1. Configuration Example of Management Server

Figure 7:
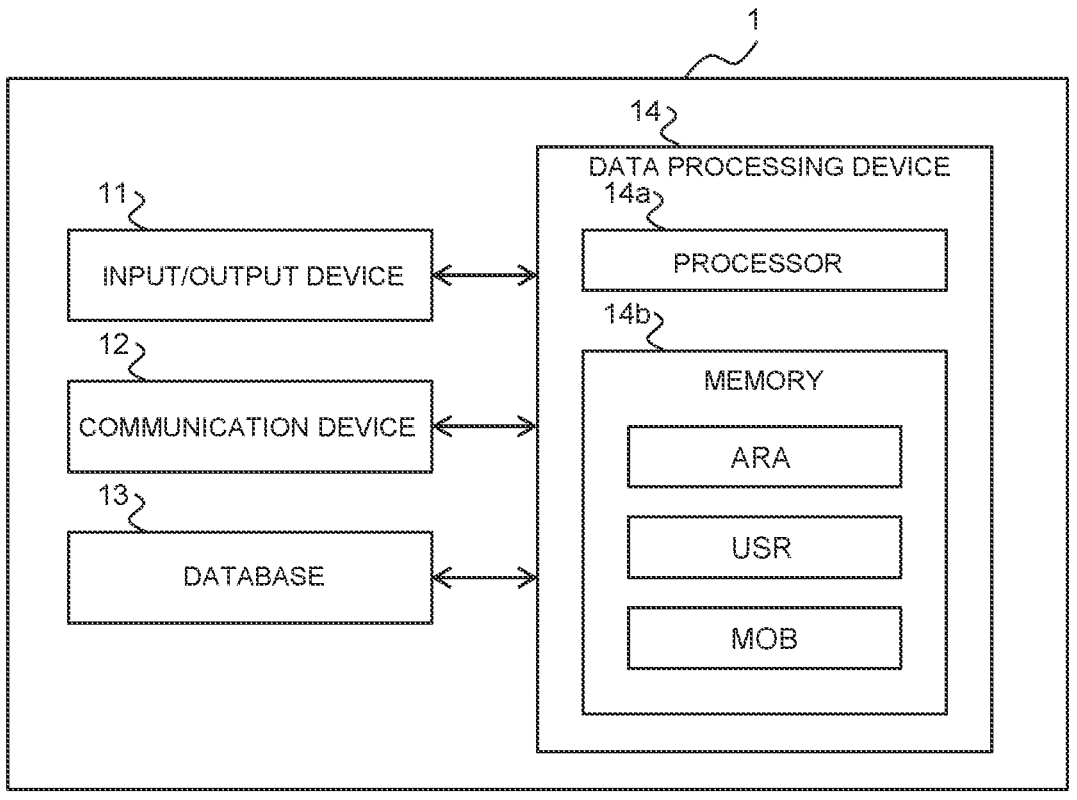
FIG. 7 is a block diagram illustrating a configuration example of a management server.

FIG. 7 is a block diagram illustrating a configuration example of the management server 1. As shown in FIG. 7, the management server 1 includes an input/output device 11, a communication device 12, a data base 13, and a data processing device 14. The data processing device 14 and the input/output device 11, the communication device 12 and the data base 13 are connected by a predetermined network.

The input/output device 11 is an interface to receive input information from an operator of the management server 1 and provide information to the operator. Examples of the input device include a keyboard, a mouse, a touch panel, a switch, and a microphone. Examples of the output device include a display device and a speaker. The operator monitors an operation state of the collection and replenishment service based on the information provided through the output device. The operator may perform a remote assistance of the travel of the mobile 3 based on the information provided through the output device. Examples of the remote assistance include a recognition support, a judgment support, and a remote operation.

The communication device 12 communicates with a device outside of the management server 1. For example, the communication device 12 communicates with a computer of the trash collection station 2 (e.g., a tablet, a smart phone) through a wireless communication network such as 4G and 5G. The communication device 12 also communicates with a computer of the mobile 3 (e.g., the controller 33 described below) through the wireless communication network. The communication device 12 also communicates with a computer of the facility 4 (e.g., the data processing device 44 described below) through the wireless communication network.

The database 13 is formed in a predetermined memory device (e.g., a hard disk, a flash memory). In the database 13, various data required for the collection and replenishment service is stored. Examples of the various data include data of service area configuration ARA, data of user USR and data of mobile MOB.

The service area configuration data ARA is data related to a configuration of a service area (e.g., one city) in which the collection and replenishment service is provided. Examples of the configuration of the service area include location data of roads, location data of the facility 4, and location data of the installation space 5. The service area configuration data ARA has been created in advance. The service area configuration data ARA may be updated at regular intervals.

The user data USR is data related to a user (e.g., the facility) of the collection and replenishment service.

Examples of the use data USR, registration data such as ID data and location data of the respective facility. A person of the facility 4 (e.g., an employee of a store, a resident of a house, etc.) operates the computer of the facility 4 to input the data for the registration. The computer of the facility 4 transmits the data for the registration to the management server 1. The management server 1 receives this data for the registration via the communication device 12 and stores it in the data base 13.

The mobile data MOB is data related to the mobile 3. The mobile data MOB is generated for each mobile 3. Examples of the mobile data MOB include data of an operation state of the mobile 3, data of a location of the mobile 3, and data of a storing state of the trash box TB. Examples of the operation state include "in operating" in accordance with the operation instruction (e.g., the collection order and the replenishment order), "waiting" for the operation instruction, and "in trouble with traffic (e.g., a stalled state)" and "in trouble with control device". Examples of the storing state include the number of the trash box TBs containing the trash and the number of the vacant trash box TBs.

The data processing device 14 is a computer that executes various data processing related to the collection and replenishment service. As a configuration for executing the various data processing, the data processing device 14 includes at least one processor 14a and at least one memory 14b. The processor 14a includes a CPU (Central Processing Unit). The memory 14b is a volatile memory such as a DDR memory, and develops program used by the processor 14a and stores various data temporarily. The various data include the service area configuration data ARA, the user data USR and the mobile data MOB read from the database 13. Examples of the processing executed by the data processing device 14 will be described later.

2-2. Configuration Example of the Mobile

Figure 8:
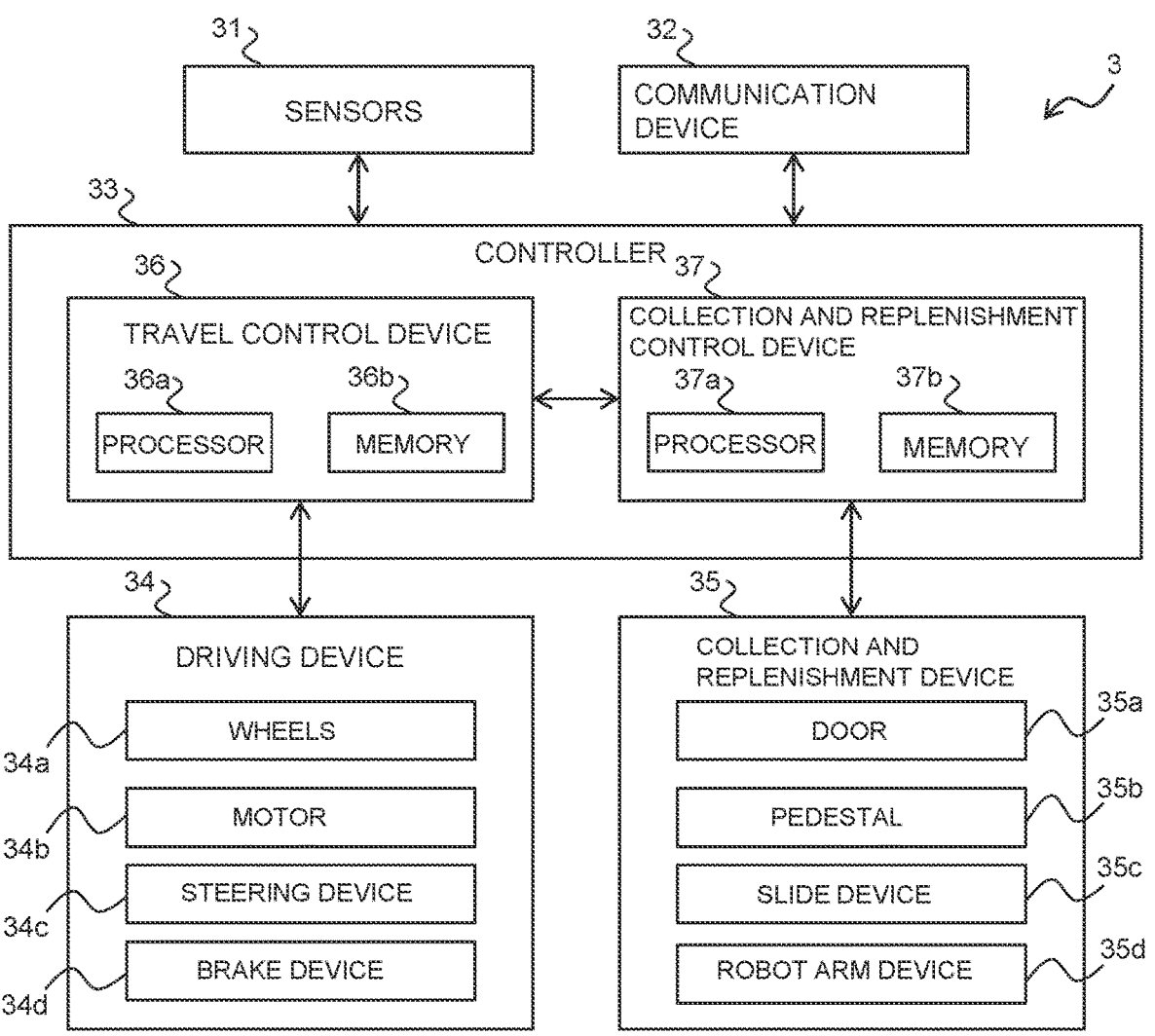
FIG. 8 is a block diagram illustrating a configuration example of a mobile.

FIG. 8 is a diagram illustrating a configuration example of the mobile 3. As shown in FIG. 8, the mobile 3 includes sensors 31, a communication device 32, a controller 33, a driving device 34, and a collection and replenishment device 35. The controller 33 and elements such as the sensors 31 are connected by an on-board network (for example, a CAN (Controller Area Network)).

The sensors 31 include a position sensor, a status sensor, and a recognition sensor. The position sensor acquires data of a position and an orientation of the mobile 3. Examples of the position sensor include a GNSS (Global Navigation Satellite System) receiver. The status sensor detects velocity, acceleration (e.g., longitudinal acceleration and lateral acceleration), yaw rate, a load weight, a remaining battery amount of the mobile 3. The recognition sensor recognizes a condition surrounding the mobile 3. Examples of the recognition sensor include a camera, a millimeter wave radar, and a LiDAR (Light Detection And Ranging). The recognition sensor may include a reader that reads an identification sign such as a bar code, a RFID tag, and the like.

The communication device 32 communicates with a device outside of the mobile 3. For example, the communication device 32 communicates with the management server 1 through a wireless communication network such as 4G and 5G. The communication device 32 also communicates with the computer of the trash collection station 2 through the wireless communication network. The communication device 32 also communicates with the computer of the facility 4 (e.g., the data processing device 44 described below) through the wireless communication network.

The controller 33 is a computer that controls the mobile 3. The controller 33 includes a travel control device 36 and a collection and replenishment control device 37. The travel control device 36 is a computer that controls the driving device 34. The driving device 34 and the travel control device 36 constitute the "automated driving device" of the present disclosure. The collection and replenishment control device 37 is a computer that controls the collection and replenishment device 35. The collection and replenishment device 35 and the collection and replenishment control device 37 constitute the "automatic collection device" of the present disclosure. Examples of the processing executed by the data processing device 33 will be described later.

The travel control device 36 includes at least one processor 36a and at least one memory 36b as a configuration for controlling the driving device 34. The collection and replenishment control device 37 includes at least one processor 37a and at least one memory 37b as a configuration for controlling the collection and replenishment device 35. The configuration of the processor 36a or 37a is essentially the same as that of the processor 14a. The configuration of the memory 36b or 37b is essentially the same as that of the memory 14b.

The driving device 34 accelerates, decelerates, and steers the mobile 3. The driving device 34 includes wheels 34a, a motor 34b, a steering device 34c, and a brake device 34d. The motor 34b drives the wheels 34a. The steering device 34c turns the wheels 34a. The brake device 34d applies a braking force to the mobile 3. The acceleration of the mobile 3 is realized by controlling the motor 34b. The deceleration of the mobile 3 is realized by controlling the brake device 34d. The braking of mobile 3 may be realized by using a regenerative brake under the control of the motor 34b. The steering of the mobile 3 is realized by controlling the steering device 34c.

The collection and replenishment device 35 loads the trash box TB installed in the installation space 5 into the mobile 3. The collection and replenishment device 35 is also unloaded the vacant trash box TB from mobile 3 and placed on the installation space 5. The collection and replenishment device 35 includes a door 35a of the mobile 3, a pedestal 35b of the trash box TB, a slide device 35c, and a robot arm device 35d.

The door 35a is provided on a opening (not shown) of the mobile 3. During the travel of the mobile 3, the door 35a is closed. During the loading of the trash box TB and the unloading of the vacant trash box TB, the door 35a is opened. The slide device 35c moves the pedestal 35b in a horizontal direction while the door 25a is opened. When the pedestal 35b is moved in the horizontal direction, the pedestal 35b is pulled out to the side of the mobile 3, or the pulled-out pedestal 35b is accommodated in the mobile 3. Examples of the slide device 35c include a conveyor and a roller. The slide device 35c may have a function to move the pedestal 35b vertically. The robot arm device 35d grasps the trash box TB installed in the installation space 5 and moves it onto the pedestal 35b. The robot arm device 35d grasps the vacant trash box TB on the pedestal 35b and moves it to the installation space 5.

2-3. Configuration Example of the Facility

Figure 9:
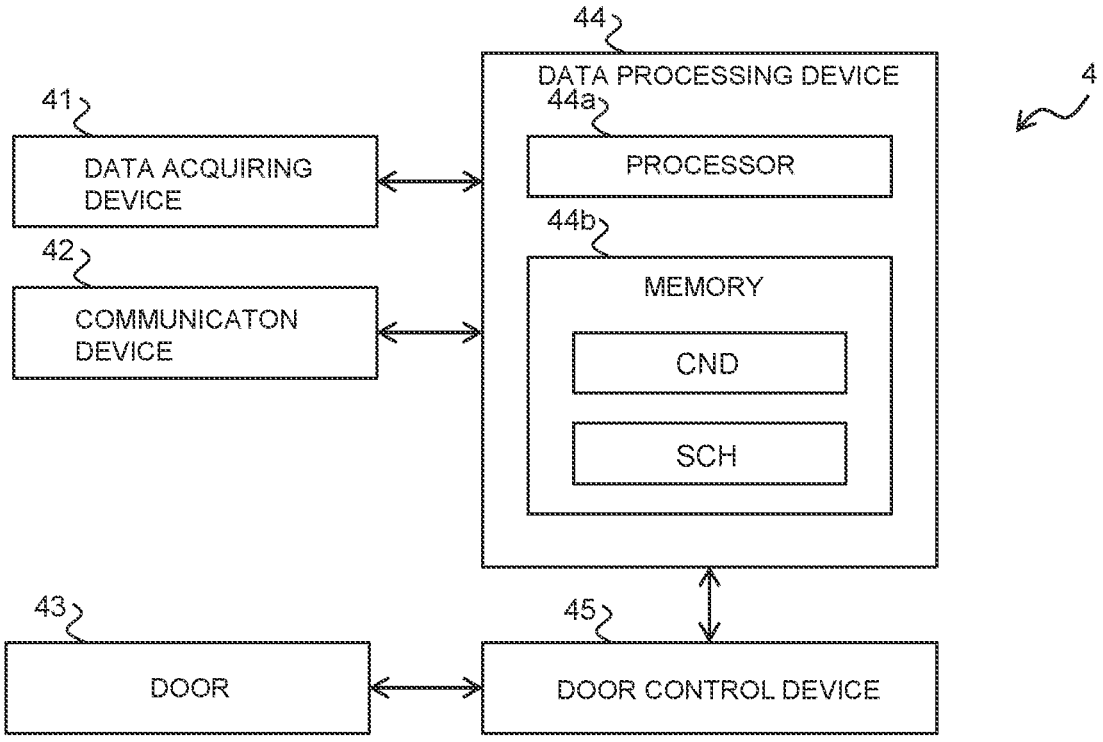
FIG. 9 is a block diagram illustrating a configuration example of a facility.

FIG. 9 is a block diagram illustrating a configuration example of the facility 4. As shown in FIG. 9, the facility 4 includes a data acquiring device 41, a communication device 42, a door 43, a data processing device 44, and a door controller 45. The data processing device 44 and the data acquiring device 41 and the communication device 42 are connected by a predetermined network. The door 43 and the door controller 45 are connected to each other by a predetermined network. The data processing device 44 and the door controller 45 are connected by a wireless communication network.

The data acquiring device 41 obtains data of collection status CND of the trash in the trash box TB. Examples of the collection status data CND include a weight of the trash box TB, an accommodation rate of the trash in the trash box TB, a residence time of the trash discarded in the trash box TB, and a concentration (or a smell level) of a specific gas around the trash box TB. Note that the collection status data CND includes data indicating that the trash box TB is set in the installation space 5.

Examples of the data acquiring device 41 for acquiring the weight include a weight sensor. The accommodation rate is expressed, for example, by a percentage assuming that the volume of the vacant trash box TB is 100% The accommodation rate is calculated based on a total volume of the trash in the trash box TB or a position of a top surface of the trash. Examples of the data acquiring device 41 for acquiring the total volume and the top position include a camera. Examples of the data acquiring device 41 for acquiring the top position include a range sensor. The residence time indicates a time elapsed since the trash was dumped in the vacant trash box TB. Examples of the data acquiring device 41 for acquiring the residence time include the camera. Examples of the data acquiring device 41 for acquiring the concentration of the specific gas include a gas sensor.

The communication device 42 communicates with a device outside of the facility 4. For example, the communication device 42 communicates with the management server 1 through a wireless communication network such as 4G and 5G. The communication device 42 also communicates with the computer of the mobile 3 (e.g., the controller 33 described below) through the wireless communication network.

The door 43 separates the road for the mobile in the facility 4 from the installation space 5. Normally, the door 43 is closed. When the door 43 is opened, the road for the mobile and the installation space 5 in the facility 4 are connected. During the loading of the trash box TB to the mobile 3 and during the unloading of the vacant trash box TB from the mobile 3, the door 43 is opened. The door 43 is controlled by the door controller 45.

The data processing device 44 is a computer that executes various data processing related to the collection and replenishment service. As a configuration for executing the various data processing, the data processing device 44 includes at least one processor 44a and at least one memory 44b. The constituent of processor 44a is essentially the same as that of processor 14a. The configuration of memory 44b is essentially the same as that of memory 14b.

In the memory 44b, collection status data CND is stored. Further, in the memory 44b, schedule data SCH is stored. The schedule data SCH indicates regular a collection and replenishment schedule of the trash box TB. The regular collection and replenishment schedule includes data of day of week and time zone. The regular collection and replenishment schedule is set for each type of the trash box TB.

3. Processing Example 3-1. Details of the Step S1

Figure 10:
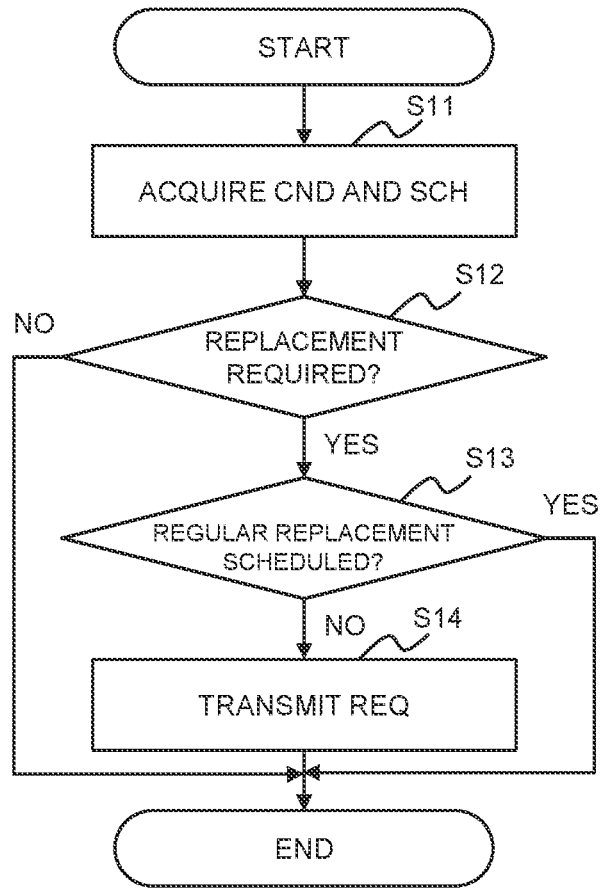
FIG. 10 is a flowchart illustrating an example of processing executed by a data processing device of the facility.

FIG. 10 is a flowchart illustrating an example of processing executed by the data processing device 44 (the processor 44a) of the facility 4. The routine shown in FIG. 10 is repeatedly executed at a predetermined control cycle.

In the routine shown in FIG. 10, first, the collection status data CND and the schedule data SCH are acquired (step S11). The collection status data CND is data of the collection status of the trash in the trash box TB and is acquired for each trash box TB. The explanation of the collection status data CND has already been described above. The collection data CND also is data indicating that the trash box TB is set in the installation space 5. In this case, the collection status data CND is acquired for each installation space 5.

After the processing of the step S11, it is determined whether the replacement (i.e., the collection or the replenishment) of the trash box TB is required (step S12). In the processing of the step S12, first, a judgment element is calculated based on the collection status data CND acquired in the step S11. The judgment element is at least one selected from the weight, the accommodation rate, the residence time and the concentration (or the smell level) of the specific gas. In the processing of the step S12, the calculated judgment element is compared with a judgment threshold. The judgment threshold is set for each type of the trash box TB.

A default value of the judgment threshold is preset in the management server 1. This default value can be changed in response to a change request from the facility 4. By changing the default value, it is possible to set the replenishment cycle in accordance with the preference of the human of the facility 4. Note that, if the judgment threshold is changed to a value other than the default value, incentives for the collection and replenishment service may be given to the facility 4. For example, if the judgment threshold is changed to extend the replenishment cycle, a charge for use of the collection and replenishment service may be discounted. Or, when transmission timing of the collection request RPU from the facility 4 is overlapped with that transmitted from another facility, a distribution priority of the mobile 3 for the former may be increased as compared with the latter.

Consider a case where the judgment element is the weight. If the weight exceeds an allowable weight, it is determined that the collection of the trash box TB is required. As the allowable weight, for example, a weight that does not exceed a load bearing a capacity of the trash box TB is set. Consider a case where the judgment element is the accommodation rate. If the accommodation rate is over a tolerance rate (e.g., 80%), it is determined that the collection of the trash box TB is required. Consider a case where the judgment element is the residence time. If the residence time exceeds an allowable duration, it is determined that the collection of the trash box TB is required. Consider a case where the judgment element is the concentration of the specific gas. If the concentration is over a tolerance concentration, it is determined that the collection of the trash box TB is required.

When two or more trash box TB are set in one installation space 5, the processing of the step S12 is executed for each trash box TB. If the judgement result of the step S12 is negative, the routine shown in FIG. 10 ends. If the judgement result of the step S12 is positive, it is determined whether the regular collection is scheduled (step S13). The processing of the step S13 is executed based on the schedule data SCH (i.e., the day of week and the time zone data) acquired in the step S1*l* and the present time. If a time difference from the present time to the regular collection time is less than a tolerance, it is determined that the regular collection is scheduled. In this situation, the routine shown in FIG. 10 ends.

If the judgement result of the step S13 is negative, the request REQ (i.e., the collection request RPU or the replenishment request RES) is transmitted to the management server 1 (step S14). As described above, the collection request RPU includes the location data of the facility 4A (the space 5A), the number data of the trash box TB to be collected, and the type data of the trash box TB to be collected. The replenishment request RRS includes the location data of the facility 4 (the installation space 5), the number data of the trash box TBs to be replenished, and the data of the type of the trash box TB to be replenished.

3-2. Details of the Step S2

Figure 11:
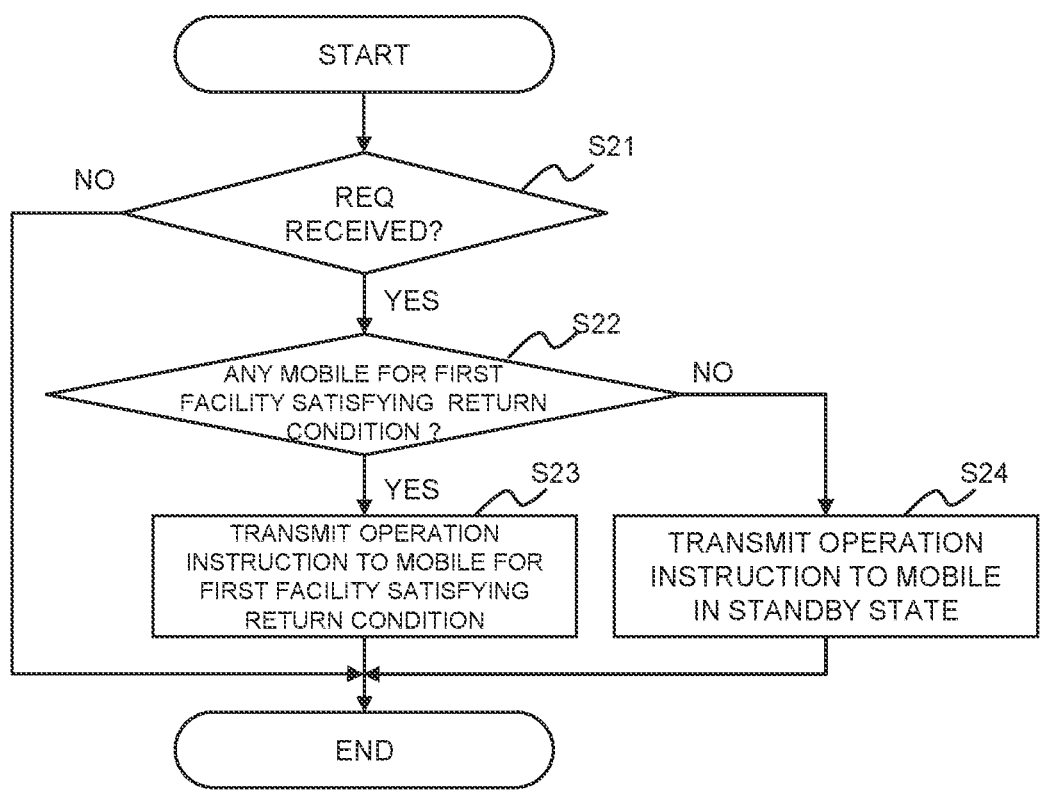
FIG. 11 is a flowchart illustrating an example of processing executed by a data processing device of the management server.

FIG. 11 is a flowchart illustrating an example of processing executed by the data processing device 14 (the processor 14*a*) of the management server 1. Note that the routine shown in FIG. 11 is repeatedly executed at a predetermined control cycle.

In the routine shown in FIG. 11, first, it is determined whether the collection request RPU has been received (step S21). When the management server 1 receives the request REQ from the facility 4, it is determined that the request REQ has been received. If the management server 1 has received the collection status data CND from the facility 4, it is determined based on this collection status data CND whether the request REQ has been received. The determination method applied in this instance includes the method described in the step S12 of FIG. 10.

If the judgement result of the step S21 is negative, the routine shown in FIG. 11 ends. If the judgement result of the step S21 is positive, it is determined whether the mobile for the first facility satisfying the return condition exists (step S22). The judgement of the step S22 is executed based on the mobile data MOB and the location data of the facility 4 included in the request REQ. The mobile for the first facility satisfying the return condition is, for example, a mobile 3 satisfying all the following conditions (1) to (5).

The mobile 3 is traveling according to the operation instruction based on another collection request RPU (e.g., the collection request RPU1) which is different from the collection request RPU (e.g., the collection request RPU2) that has been received in the step S21.

(2-1) When the request REQ is the collection request RPU, the number of vacant pedestals 35*b* corresponding to the total number of the trash box TBs to be collected remain vacant in the room of the mobile 3.

(2-2) When the request REQ is the replenishment request RRS, the number of vacant trash box TBs corresponding to the total number of replenishments remain in the mobile 3.

(3) The distance from the current location of the mobile 3 to the position of the facility 4 included in the collection request RPU (e.g., the collection request RPU2) received in the step S21 is shorter than the distance of another mobile 3 in a standby state.

(4) The distance from the current position of the mobile 3 to the position of the facility 4 included in the request REQ (e.g., the collection request RPU2) received in the step S21 is shorter than the distance from the current position of the said mobile 3 to the trash collection station 2.

(5) The distance from the position of facility 4 (e.g., facility 4A) included in the said another request REQ to the position of the facility 4 (e.g., facility 4C) included in the request REQ received in the step S21 is shorter than the distance from the position of the facility 4 (e.g., facility 4A) included in the said another request REQ to the trash collection station 2.

The above condition (1) is a condition that defines a principal element of the mobile for the first facility. The above condition (2-1) is a condition relating to a recovery surplus power of the trash box TB by the mobile for the first facility. The above condition (2-2) is a condition relating a replenishment capacity of the trash box TB by the mobile for the first facility. The above conditions (3) to (5) relate to conditions relating a replacement efficiency by the mobile for the first facility. The satisfaction of all conditions (3) to (5) means that a higher replacement efficiency is expected for the mobile for the first facility to be in charge of the request REQ received in the step S21, as compared with a case where the mobile 3 in the standby state is to be in charge of the request REQ.

If the judgement result in the step S22 is positive, the operation instruction (i.e., the collection order IPU or the replenishment order IRS) is transmitted to the mobile for the first facility satisfying the return condition (step S23). As described above, the collection order IPU includes the location data of the facility 4A in which the trash box TB to be collected is installed, the data of the number of trash box TBs to be collected, and the data of type of the trash box TB. The replenishment order IRS includes the location data of the facility 4A (the space 5A) to which the vacant trash box TB is to be replenished, the data of the number of trash box TBs to be replenished, and the type data of the trash box TB to be replenished. The collection order IPU and the replenishment order IRS may include the location data of the outbound route and the return route.

When there is a plurality of mobiles for the first facility satisfying the return condition, for example, the mobile for the first facility is narrowed down by using the following condition (6). For example, the mobile for first facility having the shortest duration of the following condition (6) is selected as the mobile 3 (i.e., the mobile for the second facility) in charge of the request REQ.

(6) Time required from the current position of the mobile for the first facility to the position of the facility 4 included in the request REQ (e.g., the collection request RPU2) received in the step S21.

If the judgement result in the step S22 is negative, the operation instruction is transmitted to the mobile 3 waiting for the operation instruction (step S24). The selection of the mobile 3 in charge of the request REQ is performed, for example, by using the condition (2-1) or (2-2) described above. When there is a plurality of mobiles 3 in waiting for the operation instruction, for example, the mobile 3 is narrowed down using the following condition (7). When the narrowing down is performed using the following condition (7), it is preferable that the travel time of the mobile 3 in the standby area 22 is also considered.

(7) Time required from the current position of the mobile 3 to the position of facility 4 included in the request REQ (e.g., the collection request RPU2) received in the step S21.

3-3. Details of the Step S3

Figure 12:
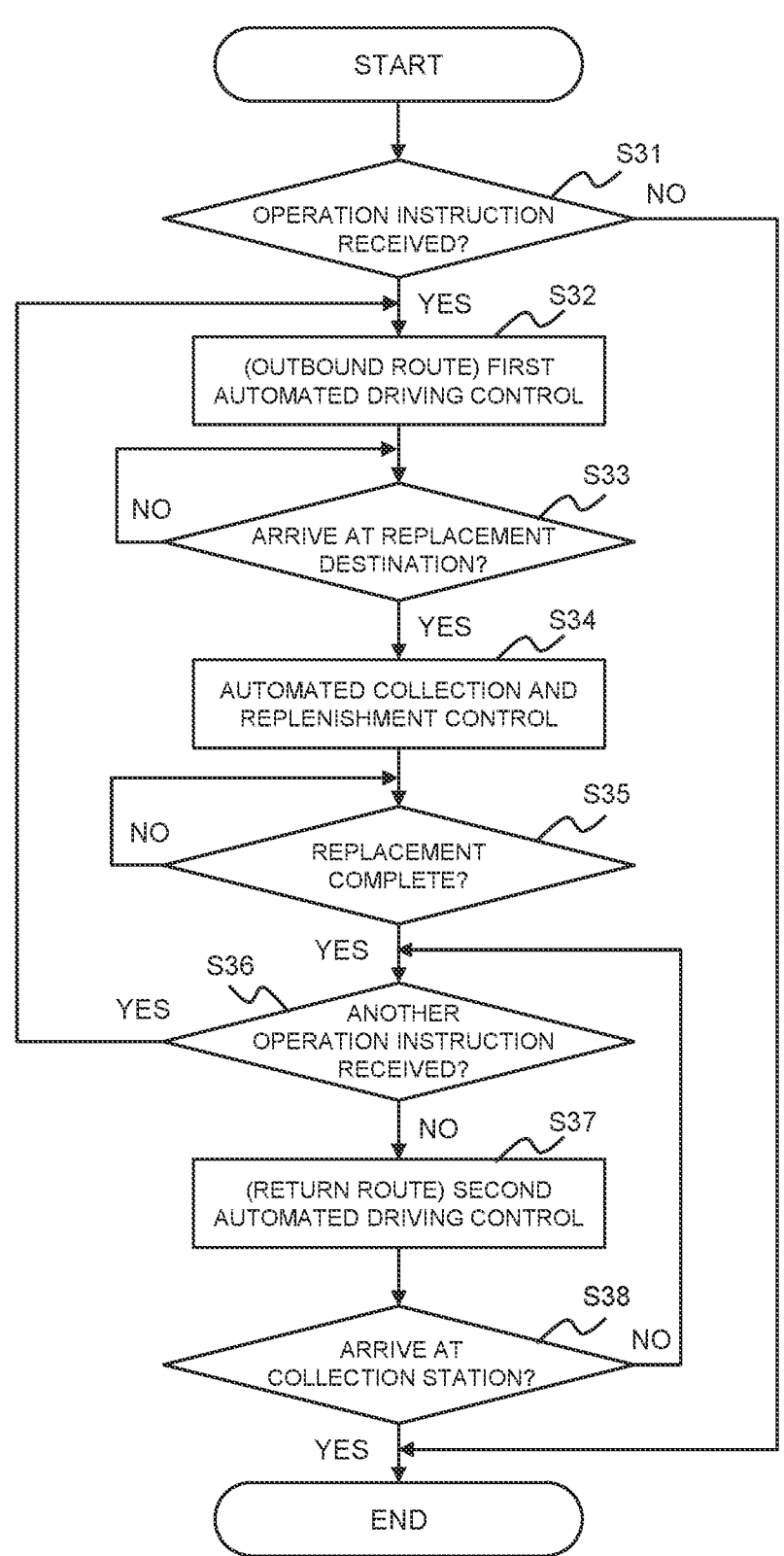
FIG. 12 is a flowchart illustrating an example of processing executed by a controller of a mobile.

FIG. 12 is a flow chart illustrating an exemplary process performed by controller 33 of mobile 3, i.e., the processors 36a and 37a. FIG. 9 is a flowchart illustrating an example of processing executed by the controller 33 (the processors 36a and 37a) of the mobile 3. Note that the routine shown in FIG. 12 is repeatedly executed at a predetermined control cycle.

In the routine shown in FIG. 10, first, it is determined whether the operation instruction has been received (step S31). If the judgement result of the step S31 is positive, the first automated driving control is executed (step S32). In the first automated driving control, first, a driving plan in the outbound route from the current location of the mobile 3 to the facility 4 is generated based on the operation instruction.

The driving plan consists of plurality of events that are executed sequentially. The plurality of events includes, for example, an acceleration event, a deceleration event, a lane maintaining event, a lane change event, and the like. The acceleration event is an event to accelerate the mobile 3. The deceleration event is an event to slow down the mobile 3. The lane maintaining event is an event in which the mobile 3 is driven so as not to deviate from a lane along which the mobile 3 is traveling. The lane change event is an event in which the mobile 3 is driven to change a lane along which the mobile 3 is traveling.

In the first automated driving control, a driving trajectory of the mobile 3 is generated based on the generated driving plan. The driving trajectory is a collection of target positions where a reference position of the mobile 3 (e.g., a location of a center of gravity of the mobile 3) should reach. The target positions are set every time a predetermined time elapses with reference to the present time.

The driving trajectory for the lane maintaining event is generated, for example, as follows. First, a driving mode is determined. The driving mode includes, for example, a cruise control mode, a following travel mode, a curve travel mode, and the like. The cruise control mode is a driving mode that is determined when there is no other mobile (e.g., a vehicle) in front of the mobile 3 and on the lane along which the mobile 3 travels. The following travel mode is a driving mode that is determined when the other mobile is traveling in front of the mobile 3 and on the lane along which the mobile 3 travels. The curve travel is a driving mode that is determined when the mobile 3 encounters a curve. If the driving mode is determined, target speed (or target acceleration) of the mobile 3 is calculated. Based on this target speed, the driving trajectory is generated.

The driving trajectory for the lane change is generated, for example, as follows. First, it is confirmed that there is no other mobile interfering with the lane change event (hereinafter also referred to as an "interfering mobile") around the mobile 3. The interfering mobile is another mobile (e.g., a vehicle) that travels in the same direction as the mobile 3. An absence of the interfering vehicle means that the interfering mobile does not exist within a predetermined distance in front of the mobile 3 in the lane on which the mobile 3 travels, and the interfering mobile does not exist within a predetermined distance in front of and behind the mobile 3 in a lane on which the mobile 3 travels after the lane change. If no interfering mobile exist, a start position of the lane change event is set. Subsequently, the target speed and target yaw rate of the mobile 3 of this start position are calculated. Then, the driving trajectory is generated based on the target speed and target yaw rate.

In the first automated driving control, the driving device 34 (i.e., the motor 34b, the steering device 34c and the brake device 34d) is controlled such that the mobile 3 travels along the generated driving trajectory. For example, a deviation of the driving trajectory and the mobile 3 is calculated. Examples of the deviations include a lateral deviation, a yaw angle deviation (an azimuth angle deviation) and a velocity deviation. Then, in the first automated driving control, a control amount of the driving device 34 is calculated such that the deviations of the driving trajectory and the mobile 3 is reduced.

After the processing of the step S32, it is determined whether the mobile 3 has arrived at a destination of the replacement (step S33). The destination of the replacement is a position of the facility 4 (the installation space 5) contained in the operation instruction. The processing of the step S33 is repeatedly executed until the mobile 3 arrives at the collection destination.

If the judgement result of the step S33 is positive, the automated collection and replenishment control is executed (step S34). In the automated collection and replenishment control, first, it is confirmed that the door 43 is opened, and it is confirmed that the trash box TB to be collected is present in the installation space 5. The recognition of the door and the trash box TB is performed based on recognition data from the sensors 31.

In the automated collection and replenishment control, the door 35a and the slide device 35c are subsequently controlled such that the pedestal 35b on which no trash box TB is seated is pulled out to the side of the mobile 3. The position of the mobile 3 may be adjusted such that the vacant pedestal 35b is in front of the trash box TB to be collected. In this case, an adjusting the position of the mobile 3 is performed by the control of the motor 34b.

In the automated collection and replenishment control, the robot arm device 35d is subsequently controlled such that the trash box TB is placed on the pedestal 35b. After that, the door 35a and the slide device 35c are controlled, and the pulled-out pedestal 35b is accommodated in the mobile 3. Thus, the trash box TB is collected in the mobile 3.

If the collection order IPU and the replenishment order IRS at the same installation space 5 have been received, the replenishment of vacant trash box TB is performed after the collection of the trash box TB. In this case, the slide device 35c is first controlled such that the pedestal 35b on which the vacant trash box TB is seated is pulled out to the side of the mobile 3. The position of the mobile 3 may be adjusted such that the pedestal 35b on which vacant trash box TB is seated is positioned in front of the installation space 5. In this case, adjusting the position of mobile 3 is performed by the control of the motor 34b.

In the automated collection and replenishment control, the robot arm device 35d is subsequently controlled, whereby the vacant trash box TB is installed in the installation space 5. After that, the door 35a and the slide device 35c are controlled, and the pulled-out pedestal 35b is accommodated in the mobile 3.

In the automated collection and replenishment control where only the replenishment of the vacant trash box TB is performed, first, it is confirmed that the door 43 is opened, and it is confirmed that the trash box TB is not present in the installation space 5. The recognition of the door 43 and the recognition of the installation space 5 are performed based on the recognition data from the sensors 31. Processing example after this confirmation is the same as the replenishment processing example where the collection order IPU and the replenishment order IRS in the same installation space 5 have been received.

After the processing of the step S34, it is determined whether the replacement of the trash box TB has been completed (step S35.) If the collection order IPU and the replenishment order IRS at the same installation space 5 have been received, it is determined whether the collection and replenishment have ended. The processing of the step S34 is repeatedly executed until the replacement has been completed.

If the judgement result of the step S35 is positive, it is determined whether another operation instruction has been accepted (step S36). If the judgement result of the step S36 is positive, processing of the steps S32 to S35 is executed.

If the judgement result of the step S36 is negative, the second automated driving control is executed (step S37). In the second automated driving control, first, a driving plan in the return route from the current location of the mobile 3 to the trash collection station 2 is generated. The processing after the generation of the driving plan is the same as the processing in the first automated driving control described in the step S32.

After the processing of the step S37, it is determined whether the mobile 3 has arrived at the trash collection station 2 (the standby area 22) (step S38). The processing of the step S38 is repeatedly executed until the mobile 3 arrives at the trash collection station 2. If the judgement result of the step S38 is positive, the processing of the routine shown in FIG. 12 ends.

4. Effect

According to the embodiment described above, when two or more request REQs are transmitted from two or more facilities 4, two or more mobiles 3 in charge of the respective request REQs are selected. If the return condition is satisfied, one mobile 3 is selected to handle the two or more request REQs. If the return condition is satisfied, one mobile 3 is selected to handle the two or more request REQs. This leads to an increase in convenience of the collection and replenishment service.

What is claimed is:

1. A system to collect a trash discarded by a facility, comprising:
    a trash box placed in a space, facing a road for a mobile, in the facility;
    a plurality of mobiles, each of which is configured to:
        travel between the facility and a trash collection station while transporting the trash box thereon; and
        perform a replacement including at least one of: a collection of the trash box installed in the space, a transport of the trash box to the trash collection station where the trash box is emptied, and a replenishment of the trash box that has been emptied so as to be installed in the space; and
    a management server configured to communicates with a computer of the facility and the plurality of mobiles, respectively,
    wherein, when the management server receives a collection or a replenishment request of the trash box from the facility, the management server executes selection processing to select a mobile in charge of the replacement in the facility from the plurality of mobiles,
    wherein the facility includes a first facility and a second facility,
    wherein the trash box includes a first trash box collected and removed from the first facility or replenished to the first facility, and a second trash box collected and removed from the second facility or replenished to the second facility,
    wherein, in the selection processing, the management server is configured to:
        select a first mobile from among the plurality of mobiles to be in charge of the replacement for the first facility;
        based upon a collection or replenishment request of the second trash box for the second facility being received during the replacement of the first trash box by the first mobile, determine whether a return condition with respect to the first mobile, which is performing the replacement of the first trash box for the first facility, is satisfied; and
        based upon a determination that the return condition is satisfied, transmit an operation instruction of the collection or replenishment request for the second facility to the first mobile,
        based upon a determination that the return condition is not satisfied, select from the plurality of the mobiles, except for the first mobile, a mobile to be in charge of the replacement for the second facility, and transmit an operation instruction of the replacement for the second facility to the selected mobile in charge of the replacement for the second facility, wherein each of the plurality of the mobiles includes a plurality of pedestals configured to transport a plurality of trash boxes thereon, and the determination of whether the return condition is satisfied includes determining whether a number of vacant trash boxes corresponds to a number of trash boxes in the replenishment request.

2. The system according to claim 1, wherein the return condition includes a condition that a distance between the first facility and the second facility is shorter than a distance between the first facility and the trash collection station.

3. The system according to claim 1, wherein the return condition includes a condition that a distance between a present location of the first mobile for the first facility and the second facility is shorter than a distance between the first facility and the trash collection station.

4. A method to collect a trash discarded by a facility by collecting a trash box installed in a space facing a road for a mobile in the facility with a plurality of mobiles, wherein each of the plurality of mobiles travels between the facility and a trash collection station while transporting the trash box thereon, and performs a replacement including at least one of: a collection of the trash box installed in the space, a transport of the trash box to the trash collection station where the trash box is emptied, and a replenishment of the trash box that has been emptied so as to be installed in the space, a management server communicates with a computer of the facility and the plurality of mobiles respectively, when the management server receives a collection or a replenishment request of the trash box from the facility, the management server executes selection processing to select a mobile in charge of the replacement in the facility from the plurality of mobiles, wherein the facility includes a first facility and a second facility, wherein the trash box includes a first trash box collected and removed from the first facility or replenished to the first facility, and a second trash box collected and removed from the second facility or replenished to the second facility, wherein, in the selection processing, the management server is configured to:

receive a collection or replenishment request of the first trash box for the first facility, select from the plurality of mobiles a first mobile to be in charge of the replacement in the first facility, and transmit to the first mobile for the first facility an operation instruction of the replacement in the first facility;

receive a collection or replenishment request of the second trash box for the second facility during the replacement of the first trash box by the first mobile for the first facility, and determine whether a return condition with respect to the first mobile, which is performing the replacement of the first trash box for the first facility, is satisfied; and based upon a determination that the return condition is satisfied, transmit an operation instruction of the collection or replenishment request for the second facility to the first mobile, based upon a determination that the return condition is not satisfied, select from the plurality of the mobiles, expect for the first mobile, a mobile to be in charge of the replacement for the second facility, and transmit an operation instruction of the replacement for the second facility to the selected mobile in charge of the replacement for the second facility, wherein each of the plurality of the mobiles includes a plurality of pedestals configured to transport a plurality of trash boxes thereon, and the determination of whether the return condition is satisfied includes determining whether a number of vacant trash boxes corresponds to a number of trash boxes in the replenishment request.

5. The system according to claim 1, wherein the trash collection station includes a trash disposal area and a standby area, wherein in the trash disposal area the trash is removed from the trash box and disposed of in the trash disposal area, and a loading of a vacant trash box to the mobile is performed, and wherein in the standby area, the plurality of mobiles waiting for: the unloading of the trash box, the loading of the trash box, or an operation instruction of the collection or replenishment request.

* * * * *